United States Patent Office 3,478,127
Patented Nov. 11, 1969

3,478,127
ADHESIVE COMPRISING POLYCHLOROPRENE, ALKYLATED p-PHENOL HAVING 2 to 6 CARBON ATOMS AND p-CRESOL CONDENSED WITH FORMALDEHYDE
Kenneth C. Petersen, Scotia, N.Y., assignor to Schenectady Chemicals, Inc., Schenectady, N.Y., a corporation of New York
No Drawing. Filed Dec. 2, 1966, Ser. No. 598,639
Int. Cl. C08d 9/10; C08g 37/20; C09j 3/16
U.S. Cl. 260—845
10 Claims

ABSTRACT OF THE DISCLOSURE

Phase resistance and heat resistance are incorporated into adhesives from neoprene and a resin made from formaldehyde and a hydrocarbyl phenol having at least 2 carbon atoms in the hydrocarbyl group, e.g. p-tert butyl phenol, by including a minor amount of cresol with the hydrocarbyl phenol. Preferably bisphenol A is included in a small amount with the other phenols to improve heat resistance. The phenolic resin has a molecular weight of 900 to 1800.

---

The present invention relates to neoprene adhesives.

It has been proposed in the past to incorporate into polymerized chloroprene (neoprene) adhesives butyl phenol-formaldehyde resin to obtain good bond strength, note Thompson Patent 2,610,910, Gerrard Patent 2,918,442 and Garrett Patent 3,185,658. Unfortunately such neoprene adhesive compositions have poor adhesion at elevated temperatures. Additionally these resins are more prone to phase upon standing. It has previously been known that molecular weight is a factor in phase resistance. However, when the molecular weight of the butyl-phenol-formaldehyde resin is brought to a phasing resistant level elevated temperature adhesion is lost.

It is an object of the present invention to prepare neoprene adhesives with improved phasing resistance.

Another object is to prepare neoprene adhesives having improved elevated temperature resistance.

Still further objects and the entire scope of the applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing solvent type adhesive cement containing polychloroprene (neoprene) and a phenolic resin which is the alkaline condensation product of formaldehyde with a mixture of (1) a para substituted phenol in which the substituent is an alkyl group of 2 to 6 carbons or is phenyl and (2) p-cresol. The para substituted phenol is preferably p-t-butyl phenol but there can be employed p-t-amyl phenol, p-hexyl phenol, p-cyclohexyl phenol, p-ethyl phenol, p-isopropyl phenol, p-n-butyl phenol or even p-phenyl phenol.

While as little as 1 mole of formaldehyde can be employed per mole of alkyl phenols or the like it has been found preferable to employ 1.5 to 2.5 moles of formaldehyde per mole of alkyl phenols.

It has also been found preferable to include 2 to 8% of 2,2 - bis-(4'-hydroxyphenyl) propane (bisphenol A) based on the total phenols reacted although the bisphenol A can be omitted with some sacrifice in heat resistance.

The para cresol is employed in an amount of at least one part, more desirably three parts and preferably 6 to 24 parts per 100 parts of the other alkyl phenols. Replacing a portion of the p-t-butyl phenol, for example, by the p-cresol gives a neoprene cement which has much improved elevated temperature adhesion and good phasing resistance.

It is critical that the catalyst employed for forming the alkyl phenol formaldehyde resin be alkaline in order to form initially a methylolated alkylphenol. The basic catalyst is then removed, e.g. by neutralization, and the methylol phenols are condensed to form a phenolic polymer containing dibenzyl ether and methylene bridges. There is an optimum range of breakdown of dibenzyl ether bridges to methylene bridges for optimum elevated temperature adhesion. Minimization of dibenzyl ether breakdown is controlled by stopping the reaction when the free formaldehyde reaches a minimum (approximately ½ hour) causes low 250° F. adhesion as does reacting at reflux for 4 hours which maximizes dibenzyl ether breakdown. The best 250° F. adhesion is developed when the dibenzyl ether breakdown is intermediate between these two extremes, e.g. after about 2 hours heating at reflux.

For best nonphasing results the molecular weight of the phenolic resin should be between about 900 and about 1800.

As alkaline catalysts for forming the phenolic resin there can be used any alkaline catalysts conventionally employed for such purpose, e.g., alkali metal hydroxides such as sodium hydroxide and potassium hydroxide, alkaline earth metal oxides and hydroxides, e.g. calcium oxide, calcium hydroxide, barium hydroxide, alkali carbonates, e.g. sodium carbonate and potassium carbonate, ammonium hydroxide, quaternary ammonium hydroxides, anion exchange resins, basic amines, e.g. triethanolamine.

The alkaline material can be neutralized with any conventional acid, e.g. hydrochloric acid, hydrobromic acid, oxalic acid, chloroacetic acid, phosphoric acid, etc.

While not essential it has been found desirable to add a small amount of basic catalyst and formaldehyde after the neutralization step to tie up any unreacted phenol.

While in the specific examples there was employed Neoprene AC (a nonsulfur modified chlorophene polymer stabilized with thiuram disulfide) there can be used other commercially available neoprenes such as Neoprene Type CG, Neoprene Type AD, Neoprene Type GN, and Neoprene W. These various neoprenes are described in Kell Patent 3,242,113.

There is employed 5 to 200 parts of the phenolic resin per 100 parts of neoprene.

The adhesive cement also contains a volatile organic solvent. This solvent can be toluene, ethyl acetate, trichloroethylene, methyl ethyl ketone, hexane, acetone, benzene or mixtures of these materials. Suitable solvent mixtures for example are shown in the Garrett patent column 3, lines 3–39.

There can also be included in the adhesive cement conventional neoprene additives such as zinc oxide and magnesium oxide and antioxidants such as Zalba-special (a hindered phenol composition coming within the disclosure and claims of U.S. Patent No. 2,999,841 and made of 45% hindered phenol, 45% sorbitol and 10% Microcell E (calcium silicate) the hindered phenol being largely 2,6-di-t-butyl-p-phenyl phenol with smaller amounts of isomeric impurities and a small amount of 2,4',6-tri-t-butyl phenyl phenol) and other hindered phenols, e.g. 2,6-di-t-butyl-4-phenylphenol, p-methyl-o-t.-butyl methylene bis-phenol as well as amines, e.g. Neozone D (N-phenyl-B-naphthylamine), N-phenyl-α-naphthylamine, etc.

Unless otherwise indicated all parts and percentages are by weight.

EXAMPLE 1

Into a 5 liter set up with an agitator and reflux condenser were loaded 54 grams of para cresol, 1160 grams of 37% aqueous formaldehyde, 905 grams of p-tert. butyl phenol, 30 grams of bisphenol A, 50 grams of methanol and 1100 grams of xylene. The temperature was brought to 55° C. and 100 grams of 50% aqueous sodium hydroxide were added. The reactants were brought to reflux and the refluxing was maintained for two hours. The resin was quenched with 600 ml. of water, cooled to 70° C. and brought to an acid pH with 235 ml. of 20% aqueous hydrochloric acid. Then 5 grams of 85% phosphoric acid were added and the mixture stirred for approximately 0.5 hour at 65° C. The water layer was then allowed to separate and was decanted. The resin was similarly washed with 600 ml. of hot water and again with 600 ml. of hot water. The resin temperature was brought to approximately 70° C. and then 1 gram of triethanolamine and 30 grams of 37% aqueous formaldehyde added. The resin was next brought to 92° C. under 15 inches of vacuum distillation. A solution of 10 grams of oxalic acid in 20 grams of water was added and the mixture was refluxed under full vacuum (about 29 inches) down to 70° C. The resin was then subjected to distillation to 100° C. at the full vacuum to remove volatiles. The vacuum was then lowered to 15 inches and the resin was brought to approximately 120° C. and held there until the melt point was 148° F. (capillary). The resin had a molecular weight of 1286 and contained 9.71% methylol.

EXAMPLE 2

There were loaded into the flask 216 grams of p-cresol, 1160 grams of 37% formaldehyde, 680 grams of p-t-butyl phenol, 30 grams of bisphenol A, 50 grams of methanol and 1100 grams of xylene. The temperature was brought to 55° C. and 100 grams of 50% sodium hydroxide added. The reactants were brought to reflux and the refluxing was maintained for two hours. The resin was quenched with 600 ml. of water, cooled to 70° C. and brought to an acid pH with 270 ml. of 20% HCl. Then 5 grams of 85% phosphoric acid were added and the mixture stirred for approximately 0.5 hour at 65° C. The water layer was allowed to separate and was decanted. The resin was washed twice with 600 ml. of hot water and then the resin temperature was brought to approximately 70° C. Then 1 gram of triethanolamine and 30 grams of 37% formaldehyde added. The resin was next brought to 92° C. under 15 inches of vacuum distillation. A solution of 10 grams of oxalic acid in 20 grams of water was added and the mixture was refluxed under full vacuum down to 70° C. The resin was then subjected to distillation to 100° C. at the full vacuum to remove volatiles. The vacuum was then lowered to 15 inches and the resin was brought to approximately 120° C. and held there until the melt point was 146° F. (capillary). The molecular weight was 1375 and the resin had 9.73% methylol.

EXAMPLE 3

The procedure of example 2 was repeated except that the final vacuum treatment was continued until the resin had a melt point (capillary) of 168° F. The resin had a molecular weight of 1839 and had 9.03% methylol.

EXAMPLE 4

There were loaded into the flask 108 grams of p-cresol, 1160 grams of 37% formaldehyde, 900 grams of p-t-amyl phenol, 30 grams of bisphenol A, 50 grams of methanol and 100 grams of xylene. The temperature was brought to 55° C. and 100 grams of 50% sodium hydroxide added. The reactants were brought to reflux and the refluxing was maintained for two hours. The resin was quenched with 600 ml. of water, cooled to 70° C. and brought to an acid pH with 200 ml. of 20% HCl. Then 5 grams of 85% phosphoric acid were added and the mixture stirred for approximately 0.5 hour at 65° C. The water layer was allowed to separate and was decanted. The resin was washed twice with 600 ml. of hot water and then the resin temperature was brought to approximately 70° C. Then 1 gram of triethanolamine and 30 grams of 37% formaldehyde added. The resin was next brought to 92° C. under 15 inches of vacuum distillation. A solution of 10 grams of oxalic acid in 20 grams of water was added and the mixture was refluxed under full vacuum down to 70° C. The resin was then subjected to distillation to 100° C. at the full vacuum to remove volatiles. The vacuum was then lowered to 15 inches and the resin was brought to approximately 120° C. and held there until the melt point was 147° F. (capillary). The molecular weight was 1092 and the resin had 11.7% methylol.

EXAMPLE 5

The procedure of Example 4 was repeated except that the final vacuum treatment was continued until the resin had a melt point (capillary) of 156° F. The resin had a molecular weight of 1114 and had 14.8% methylol.

EXAMPLE 6

There were loaded into the flask 108 grams of p-cresol, 1160 grams of 37% formaldehyde, 830 grams of p-t-butyl phenol, 30 grams of bisphenol A, 50 grams of methanol and 1100 grams of xylene. The temperature was brought to 55° C. and 100 grams of 50% sodium hydroxide added. The reactants were brought to reflux and the refluxing was maintained for two hours. The resin was quenched with 600 ml. of water, cooled to 70° C. and brought to an acid pH with 275 ml. of 20% HCl. Then 5 grams of 85% phosphoric acid were added and the mixture stirred for approximately 0.5 hour at 65° C. The water layer was allowed to separate and was decanted. The resin was washed twice with 600 ml. of hot water and then the resin temperature was brought to approximately 70° C. Then 1 gram of triethanolamine and 30 grams of 37% formaldehyde added. The resin was next brought to 92° C. under 15 inches of vacuum distillation. A solution of 10 grams of oxalic acid in 20 grams of water was added and the mixture was refluxed under full vacuum down to 70° C. The resin was then subjected to distillation to 100° C. at the full vacuum to remove volatiles. The vacuum was then lowered to 15 inches and the resin was brought to approximately 120° C. and held there until the melt point was 170° F. (capillary). The molecular weight was 1275 and the resin had 10.7% methylol.

EXAMPLE 7

The resins prepared in Examples 1–6 were tested in neoprene adhesives using the following formulation.

Part A

|  | Grams |
| --- | --- |
| Neoprene AC | 100.0 |
| Zinc oxide | 5.0 |
| Magnesium oxide | 4.0 |
| Zalba-special (phenolic antioxidant) | 2.0 |
| Toluene | 333.0 |

Part B

|  |  |
| --- | --- |
| Resin | 45.0 |
| Magnesium oxide | 4.5 |
| Water | 2.0 |
| Toluene | 47.5 |

Part B was rolled in a pint can overnight and then part A and part B were combined to form the final adhesive. The neoprene adhesive thus formed was then tested as an adhesive to join cotton duck to a painted steel panel. The bonding strengths were measured at room temperature, 158° F. and 250° F. The results are set forth in the table.

TABLE

| Bond strength | Resin Ex. 1 | Resin Ex. 2 | Resin Ex. 3 | Resin Ex. 4 | Resin Ex. 5 | Resin Ex. 6 |
| --- | --- | --- | --- | --- | --- | --- |
| Room Temp. | 122 p.s.i.+ | 100 p.s.i. | 126 p.s.i. | 106 p.s.i. | 137 p.s.i. | 118 p.s.i. |
| 158° F. | 80 p.s.i.+ | 51 p.s.i. | 66 p.s.i. | 50 p.s.i. | 57 p.s.i. | 81 p.s.i. |
| 250° F. | 57 p.s.i. | 33 p.s.i. | 22 p.s.i. | 22 p.s.i. | 11 p.s.i. | 51 p.s.i. |

EXAMPLE 8

The procedure of Example 7 was repeated but the Zalba-special was replaced by 2.0 grams of 2,6-di-tertiary-butyl-4-phenylphenol. The resulting adhesives obtained using each of the resins of Examples 1–6 had substantially the same bond strength properties as the adhesives prepared in Example 7 and set forth in the table.

EXAMPLE 9

Part A

| | Grams |
| --- | --- |
| Neoprene AC | 100 |
| Neozone D (N-phenyl-B-naphthylamine) | 2 |
| Zinc oxide | 5 |
| Magnesium oxide | 6 |

This mixture was milled on a cold mill for 20 minutes. The milled mixture was then dissolved at room temperature in solvent C. Solvent C was made from 151 grams of toluene, 151 grams of methyl ethyl ketone and 151 grams of hexane.

Part B

| | Grams |
| --- | --- |
| Resin | 0.9 |
| Solvent C | 5.4 |
| Part A dissolved in solvent C | 11.32 |

The finished neoprene adhesive thus prepared (part B) was stirred and poured into a test tube which was corked and observed for phasing (separation into discrete layers) for two weeks. There was no separation observed when the resin was that of any one of Examples 1, 2, 3, 4, 5 and 6. Thus all of the resins employed in the present invention imparted excellent phase resistance to the neoprene adhesive.

What is claimed is:

1. In an adhesive cement composition comprising 100 parts by weight of a polymer of chloroprene and 5 to 200 parts by weight of a phenol-formaldehyde resin which is an alkaline catalyzed condensation product of at least 1 mole of formaldehyde with (A) 1 mole of para substituted phenol having the formula

wherein $R_1$ is alkyl of 2 to 6 carbon atoms or phenyl and (B) 1 to 24 parts of para-cresol per hundred parts by weight of the para substituted phenol.

2. A composition according to claim 1 including a volatile organic solvent.

3. A composition according to claim 1 wherein the para substituted phenol is p-t-butyl phenol or p-t-amyl phenol.

4. A composition according to claim 3 wherein the para cresol is 6 to 24 parts per 100 parts of the p-t-butyl phenol or p-t.amyl phenol.

5. A composition according to claim 4 wherein said phenol-formaldehyde resin includes a small amount of 2,2-bis-(4'-hydroxyphenyl) propane as a part of the phenol.

6. A composition according to claim 5 wherein the 2,2-bis-(4'-hydroxyphenyl) propane is 2 to 8% of the total phenol.

7. A composition according to claim 4 wherein there is employed 1.5 to 2.5 moles of formaldehyde per mole of the total phenols.

8. A composition according to claim 7 wherein the phenol-formaldehyde resin has a molecular weight of about 900 to about 1800.

9. A composition according to claim 8 wherein the para substituted phenol is p-t-butyl phenol.

10. A composition according to claim 1 wherein 3 to 24 parts of para-cresol are employed per 100 parts of the para substituted phenol.

References Cited

UNITED STATES PATENTS

| 2,610,910 | 9/1952 | Thomson | 260—845 |
| 2,918,442 | 12/1959 | Gerard | 260—845 |
| 3,000,847 | 9/1962 | Graham | 260—845 |
| 3,044,976 | 7/1962 | Brooks | 260—845 |
| 3,086,951 | 4/1963 | Wile | 260—845 |
| 3,144,428 | 8/1964 | Kost | 260—845 |
| 3,185,658 | 5/1965 | Garrett | 260—845 |
| 3,231,419 | 1/1966 | Korpman | 260—845 |
| 3,242,113 | 3/1966 | Kell | 260—845 |
| 3,308,087 | 3/1967 | Garrett | 260—845 |
| 3,394,099 | 7/1968 | Garrett | 260—845 |

MURRAY TILLMAN, Primary Examiner

PAUL LIEBERMAN, Assistant Examiner

U.S. Cl. X.R.

260—31.2, 33.4, 33.6, 33.8, 45.9, 45.95, 54, 57

UNITED STATES PATENT OFFICE
CERTIFICATE OF CORRECTION

Patent No. 3,478,127                        November 11, 1969

Kenneth C. Petersen

It is certified that error appears in the above identified patent and that said Letters Patent are hereby corrected as shown below:

Column 5, line 45, "In an" should read -- An --.

Signed and sealed this 27th day of October 1970.

(SEAL)
Attest:

Edward M. Fletcher, Jr.                    WILLIAM E. SCHUYLER, JR.
Attesting Officer                           Commissioner of Patents